United States Patent Office 3,380,987
Patented Apr. 30, 1968

3,380,987
PROCESS FOR PREPARING COLORED POLYEPOXIDE POLYMERS
Richard A. Palm, Niederdollendorf, Harald H. O. Cherdron, Ittenbach, Hans H. W. Ohse, Oberdollendorf, and Friedrich W. A. G. K. Korte, Hangelar, Germany, assignors to Shell Oil Company, New York, N.Y., a corporation of Delaware
No Drawing. Filed June 23, 1965, Ser. No. 466,455
Claims priority, application Germany, June 30, 1964, S 91,790
3 Claims. (Cl. 260—141)

This invention relates to the preparation of colored polymers. More particularly, the invention relates to color fast polymeric azodyestuffs and their preparation.

Colored polymers have been prepared by a number of methods heretofore which have not altogether been satisfactory. For example, by one method, polyolefins are prepared in the presence of a naphthol derivative and a diazonium compound. However, it has been found that the naphthol acts as a chain terminator thereby adversely affecting the molecular weight of the polymer. By another method, diazonium monomers having vinyl groups are copolymerized with ethylenically unsaturated materials to produce colored polymers. Such diazonium monomers are limited and often expensive and/or difficult to obtain in commercial quantities.

It is also known to combine azodyestuffs with polymers via reactive groups present in both starting materials, so that these high molecular weight materials are suitable for finishing textiles with a simultaneous dyeing operation. Naturally, only those azodyestuffs are suitable which do not lose essential dyeing properties in a conversion of this type. In addition, the reaction between the reactive group of the polymer and that of the azodyestuff requires higher temperatures which excludes the use of sensitive dyestuffs for special purposes, or at least give rise to undesirable side reactions. Consequently, a process of this type is not suitable for the preparation of colored polymers.

According to this invention, a process is provided whereby a variety of colored polymers may be economically and easily prepared from readily obtainable starting materials. Specifically, colored polymers are prepared by reacting a polymer containing epoxy group with a primary or secondary aromatic amine and treating the aminated polymer with a diazonium salt of an aromatic amine at a temperature between about 0 and 20° C.

The starting polymers which are reacted with the aromatic amine may be any polymer containing a plurality of epoxy groups, i.e.,

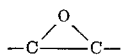

groups. Suitable polymeric polyepoxides include glycidyl polyethers prepared by reacting a polyhydric phenol such as catechol, resorcinol, hydroquinone, pyrogallol, phloroglucinol, dihydroxybiphenyl, dihydroxyphenyl alkanes (bisphenols), bishydroxybenzyl phenols, etc., or a polyhydric polyol, such as ethylene glycol, 2,3-butanediol, glycerol, polyethylene glycol, polypropylene glycol, glycerol-propylene oxide adducts, sorbitol-propylene oxide adducts, etc., with a halo-epoxy-substituted alkane such as epichlorohydrin, 1,4-dichloro-2,3-epoxybutane, etc., in the presence of an alkaline medium; polymers prepared by polymerizing unsaturated epoxides such as allyl glycidyl ether, glycidyl methacrylate, vinylcyclohexene oxide, beta-oxiranyl-beta-propiolactone, alone or with other ethylenically unsaturated monomers; epoxidation products of polymers having residual ethylenic unsaturation such as obtained by treating polymers and copolymers of conjugated diolefinically unsaturated hydrocarbons, for example, butadiene, isoprene, piperylene, vinylcyclohexene, and the like, or copolymers thereof with materials such as styrene, acrylonitrile, etc., with epoxidizing agents such as perbenzoic acid, peracetic acid, monoperphthalic acid and the like. It will be appreciated that where ethylenically unsaturated epoxy containing monomers are used to form the polymers, the latter may be polyethers containing ethylenic unsaturation prepared by polymerization via the epoxy groups which polymers are in turn epoxidized or the monomers may be polymerized through the ethylenic unsaturation resulting in epoxy containing polymers. The particular polyepoxide to be reacted will depend on the nature and properties of the final colored polymer desired.

The amines reacted with the polymeric polyepoxides are primary and secondary aromatic amines of the formula

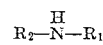

wherein $R_1$ is an aryl group and $R_2$ is selected from hydrogen, alkyl and aryl groups. The hydrocarbyl groups $R_1$ and $R_2$ may be unsubstituted or they may be substituted with alkyl, alkoxy, halogen (preferably chlorine or bromine), —$NO_2$ or —$SO_3H$ groups. The substituted groups on $R_1$ are limited to the ortho or meta positions. $R_1$ preferably contains from 6 to about 12 carbon atoms and $R_2$, when hydrocarbyl, preferably contains from 1 to about 12 carbon atoms. Examples of suitable amines include aniline, o- and -toluidine, methylaniline, butylaniline, chloromethylaniline, diphenylamine, alpha-naphthylamine, 2-chloroaniline, 3-sulfoaniline, di(2-nitrophenyl)amine, etc.

The amount of amine used to react with the polyepoxide may be varied depending on the number of reactive amine groups desired for further reaction with the diazonium salt. However, it is preferable to use a stoichiometric excess of amine, i.e., an excess of the amount necessary to provide one amine for each epoxy group. The reactants may be combined in any convenient manner. The reaction temperature is preferably between about 20° C. and the boiling point of the amine at a given pressure provided the temperature does not exceed the temperature at which the polyepoxide decomposes.

The polymeric polyepoxide amine reaction product is then reacted with a diazonium salt. Suitable diazonium salts are those of the general formula

wherein R is an aryl group and may be unsubstituted or substituted with alkyl, alkoxy, halogen (preferably chlorine or bromine), —$NO_2$ or —$SO_3H$. R preferably contains from 6 to about 16 carbon atoms. X is a mineral acid anion such as $Cl^-$, —$OSO_3H^-$, etc.

The reaction of the aminated polyepoxide and the diazonium salt is conducted at a temperature of between 0 and 20° C. The reaction may be carried out in aqueous or organic solvent mediums. Suitable organic solvents are materials in which the aminated epoxy resin is soluble and which will not interfere with the reaction and include alcohols, ethers, ketones, nitriles, amines, sulfones, etc., such as diethyl ether, tetrahydrofuran, 1,2-dimethoxyethane, 2-methoxyethanol, methyl ethyl ketone and the like. It may in some instance be advantageous to use a buffer which is compatible with the solvent. Thus, in an aqueous reaction medium an alkali metal acetate or carbonate is suitable and in an organic medium an organic base such as pyridine and the like may be used.

The amount of diazonium salt used in the reaction is not critical and may be varied depending on the intensity of color desired. For maximum coloring it is preferable to use a stoichiometrically equivalent amount of diazonium salt thereby providing a mole ratio of amine groups to diazonium salt of about 1:1 and up to about 1:2 respectively to insure a coupling of a diazonium ion on each amine group of the polymer.

The reaction of polymer and diazonium salt results in a colored polymer whereby the coloring agent is part of the polymer molecule. The colored polymer may be used itself in preparing fibers or it may be used as a polymeric dyestuff and thus be copolymerized or physically combined in amounts of between about 0.001 and 10% by weight with other materials and polymers to produce unusually color fast products, such as moldings, fibers, films, coatings, etc. Thus, for example, where the polymeric dyestuff contains residual ethylenic unsaturation it may be copolymerized with other ethylenically unsaturated polymers. Alternatively, where less than all of the epoxide groups of the polymer are reacted with the aromatic amine thereby leaving residual epoxide groups the polymer may be copolymerized with other polyepoxide materials to be colored. In such a case, the dyestuff becomes part of the polymer itself thereby producing permanently color fast materials. Where the material to be colored does not contain groups which are chemically reactive with the colored polymer molecule, the well known physical methods (bulk, solution, etc.) of dyeing the material are used. It will be appreciated that the actual amount of colored polymer used in treating an uncolored material will depend on the number of reactive groups available in the respective polymers and/or the intensity of color desired as well as economic considerations.

Where the polymeric dyestuff is to be used in the preparation of colored fibers, the particular polymer may be chosen which can be readily absorbed on the fiber material. Thus, for example, a copolymer of sulfonated styrene and butadiene when epoxidized, aminated and coupled with a diazonium salt according to the instant process produces a suitable dyestuff for cotton fibers.

The process described herein affords a number of advantages in obtaining valuable colored polymers over previously known methods. Thus, a great number of starting polymers may be used as set forth above. By varying the amine and diazonium salts, a variety of colors may be obtained without any problem of incompatibility of a particular dyestuff with a given polymer since the dye is produced on the polymer itself. The process is also economically and commercially attractive in that only a relatively small and determinable amount of dye, i.e., diazonium salt is utilized in the reaction which may further be regulated by the number of amine groups added to the polyepoxide, as set forth above. The excess or unreacted materials may also be readily recovered. Additionally, the selection of suitable polymers in preparing polymeric dyestuffs which are compatible with a non-colored polymer to be dyed with said dyestuffs offers the advantage of not altering the physical properties of the final products as is often the case when using pigments for dyeing polymers.

The following examples are provided to illustrate the manner in which the invention is carried out. It is to be understood that the examples are for the purpose of illustration only and the invention is not to be regarded as limited to any of the specific compounds or conditions recited therein. Unless otherwise specified, parts and percents disclosed are given by weight.

EXAMPLE I

Polyvinylcyclohexene oxide (5 g., 0.04 mol) was dissolved in 180 cc. of benzene and to the solution 0.04 mol of 40% peracetic acid in acetic acid was slowly added dropwise for one hour with stirring at 20° C. After 21 hours the reaction solution was washed with soda solution and water. The organic layer was separated and dried over magnesium sulfate. The solvent was then stripped off and 5.4 g. of epoxy-containing polymer was obtained having the following analysis:

Epoxide content, mol percent—67,
Ethylenic unsaturation, mol percent—33,
Melting point—140° C.

The epoxidized vinylcyclohexene oxide polymer (.800 g.) prepared above was heated with 8 g. of alpha-naphthylamine at 180° C. for 7 hours under nitrogen in a sealed tube. The reaction mixture was then mixed with chloroform and precipitated in a 1:2.8 benzene-petroleum ether mixture until the polymer was free of monomeric amine. The amount of polymeric amine recovered was 0.735 g. having the analysis, C=76.4%, H=7.5%, N=5.5%.

A quantity of 0.500 g. ($1.95 \times 10^{-3}$ mol of amine) of the amine containing polymer prepared above was dissolved in 10 ml. of tetrahydrofuran and the solution added to a solution of 0.360 g. of alpha-naphthyldiazonium chloride ($2 \times 10^{-3}$ mol) in 20 ml. of glacial acetic acid and 10 ml. of tetrahydrofuran at 0° C. A solution of 3 ml. of pyridine and 5 ml. of tetrahydrofuran was then added dropwise and the reaction mixture stirred overnight in an ice bath. The crude product was precipitated with 600 ml. of $H_2O$ separated and dried. The crude product was dissolved in conc. sulfuric acid and precipitated in ether yielding 0.660 g. of dark blue polymeric dyestuff which is soluble in dimethylformamide, dimethylsulfoxide and aniline turning dark red. In dimethyl formamide the UV spectrum showed two bands at 525 m$\mu$ and 267 m$\mu$.

This colored polymer in dimethyl formamide solution was mixed with a solution of polyacrylonitrile (same solvent) at a polymer weight ratio of 1:100, respectively. Fibers were then spun from this solution into water, the polymeric fibre having a red color. The color was fast when the fibers were soaked and turned to deep blue in the presence of acid solutions or vapors.

EXAMPLE II

Epoxidized polyisoprene was reacted with a stoichiometric excess of methylaniline at 200° C. for 7 hours to yield a polymer having a nitrogen content of 1.7%. This polymer (128.5 mg.) was dissolved in 10 cc. of tetrahydrofuran and the solution was added to 12.85 cc. of aqueous solution of 0.01 N benzene diazonium chloride at 0° C. to which mixture 2 cc. of 0.1 N sodium acetate solution was added. The reaction mixture was stirred overnight at 0° C. Chloroform (20 cc.) was added to the resulting product mixture and the organic layer was separated and washed with dilute acid and water, separated and dried over magnesium sulfate followed by the removal of the solvent. The yield was 130 mg. of orange colored polymeric dyestuff. A thin layer chromatogram on silica gel with benzene or chloroform showed no monomer dye present. The polymer showed UV absorption at 415 m$\mu$ and 256 m$\mu$.

EXAMPLE III

The procedure of Example II was repeated with the substitution of a liquid glycidyl polyether (Epon 828—Shell Chemical Company) prepared by reacting 2,2-bis (4-hydroxyphenyl)propane and epichlorohydrin in an alkaline medium and having the formula

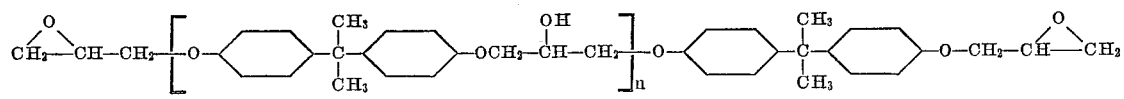

having an epoxide equivalent of 0.52–0.55 equiv./100 g. and an average molecular weight of 380. The resulting colored polymer is colorfast and shows the same UV absorption bands as the monomeric dye (i.e., 415 and 256 mµ).

EXAMPLE IV

A quantity of 443 mg. of the epoxidized polyisoprene-methylaniline reaction product of Example II was dissolved in 10 cc. of glacial acetic acid followed by the addition of a solution of 0.0004 mol of benzene diazonium chloride in 1 cc. of glacial acetic acid. The solution turned dark red. Pyridine (0.0004 mol) in 5 cc. of glacial acetic acid was added slowly and the reaction mixture allowed to stand overnight at room temperature (below 20° C.). The resulting polymeric dyestuff was precipitated in 100 cc. of $H_2O$ containing 3.2 g. sodium acetate, washed with water and dried. The crude polymer (433 mg.) was reprecipitated from tetrahydrofuran and petroleum ether. A thin layer chromatogram showed no monomeric dye present. The polymer showed UV absorption at 415 mµ and 256 mµ.

Similar polymeric dyestuffs were prepared from epoxidized polyvinylcyclohexene and isoprene-isobutylene copolymer as set forth in the examples above. The UV spectra of the polymeric diazo-dyestuffs showed the same absorption as the monomeric systems containing the same chromophor.

We claim as our invention:
1. A process for preparing colored polymers which comprises reacting a polymeric polyepoxide having a plurality of 1,2-epoxide groups with an amine having the general formula

$$R_2-\underset{\underset{H}{|}}{N}-R_1$$

wherein $R_1$ is an aryl group and $R_2$ is selected from the group consisting of hydrogen, alkyl and aryl and treating the reaction product with an aryl diazonium salt of the formula $$(R-N\equiv N)^+X^-$$

wherein R is an aryl group and X is an anion of a mineral acid at between 0 and 20° C.

2. The process of claim 1 wherein the groups R, $R_1$ and $R_2$ may contain substituents selected from the group consisting of alkyl, alkoxy, halogen, $-NO_2$ and $-SO_3H$, the substituent of $R_1$ being limited to the ortho and meta positions.

3. A colored polymer prepared by the process of claim 1.

No references cited.

WILLIAM H. SHORT, *Primary Examiner.*

T. KERWIN, *Assistant Examiner.*